US012518905B2

(12) United States Patent
Sagara et al.

(10) Patent No.: US 12,518,905 B2
(45) Date of Patent: Jan. 6, 2026

(54) COIL COMPONENT

(71) Applicant: Murata Manufacturing Co., Ltd., Kyoto-fu (JP)

(72) Inventors: Takuma Sagara, Nagaokakyo (JP); Kota Takayama, Nagaokakyo (JP); Masashi Miyamoto, Nagaokakyo (JP); Shingo Nakamoto, Nagaokakyo (JP); Kaori Takezawa, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 946 days.

(21) Appl. No.: 17/714,762

(22) Filed: Apr. 6, 2022

(65) Prior Publication Data

US 2022/0328229 A1 Oct. 13, 2022

(30) Foreign Application Priority Data

Apr. 8, 2021 (JP) ................................ 2021-065965

(51) Int. Cl.

*H01F 17/04* (2006.01)
*H01F 27/26* (2006.01)
*H01F 27/28* (2006.01)
*H01F 27/29* (2006.01)

(52) U.S. Cl.

CPC ......... *H01F 17/045* (2013.01); *H01F 27/263* (2013.01); *H01F 27/2823* (2013.01); *H01F 27/29* (2013.01)

(58) Field of Classification Search

CPC ..................................................... H01F 17/045
USPC .......................................................... 336/221
See application file for complete search history.

(56) References Cited

U.S. PATENT DOCUMENTS 6,373,366 B1 * 4/2002 Sato ...................... H01F 27/292 336/200
2010/0090790 A1 * 4/2010 Azuma ................. H01F 17/045 336/221

FOREIGN PATENT DOCUMENTS

| | | | |
|---|---|---|---|
| JP | 2001-093756 | A | 4/2001 |
| JP | 2018-174219 | A | 11/2018 |
| JP | 6477622 | B2 | 3/2019 |
| JP | 2020-057656 | A | 4/2020 |
| WO | 2018/029998 | A1 | 2/2018 |

* cited by examiner

*Primary Examiner* — Ronald Hinson
(74) *Attorney, Agent, or Firm* — Studebaker Brackett PLLC

(57) ABSTRACT

A coil component having a first flange portion connected to a first end of a winding core portion on a first positive direction side, a second flange portion connected to a second end of the winding core portion on a first negative direction side, and a top plate extending through a longer range in a direction along a center axis than the winding core portion and connected to the first and second flange portions via an adhesive which does not contact the winding core portion. A first presence area is where the adhesive is on a surface of the top plate. A second presence area consists of a second area where the adhesive is on a surface of the first flange portion and a fourth area where the adhesive is on a surface of the second flange portion. The first presence area is larger than the second presence area.

20 Claims, 4 Drawing Sheets

COIL COMPONENT

CROSS-REFERENCE TO RELATED APPLICATION

This application claims benefit of priority to Japanese Patent Application No. 2021-065965, filed Apr. 8, 2021, the entire content of which is incorporated herein by reference.

BACKGROUND

Technical Field

The present disclosure relates to a coil component.

Background Art

A coil component disclosed in Japanese Patent No. 6477622 includes a core including a winding core portion having a center axis, a first flange portion, a second flange portion, and a top plate. The winding core portion has a quadrangular columnar shape. The first flange portion is connected to a first end of the winding core portion. The first flange portion projects outwardly from a peripheral surface of the winding core portion in a radial direction centered on the center axis. The second flange portion is connected to a second end of the winding core portion. The second flange portion projects outwardly from the peripheral surface of the winding core portion in a radial direction centered on the center axis. The top plate extends through a longer range in a direction along the center axis than the winding core portion. The top plate is connected to the first flange portion and the second flange portion via an adhesive.

A load may act on the top plate of the coil component disclosed in Japanese Patent No. 6477622. Specifically, for example, when mounting the coil component on a substrate, the top plate may be pressed towards the substrate. When a load acts on the top plate in this way, there is a risk of the top plate not being able to withstand the load and becoming damaged.

SUMMARY

Accordingly, an aspect of the present disclosure provides a coil component including a core including a winding core portion having a center axis, a first flange portion connected to a first end, in a direction along the center axis, of the winding core portion and projecting outwardly from a peripheral surface of the winding core portion in a radial direction centered on the center axis, and a second flange portion connected to a second end of the winding core portion. The second end is on an opposite side from the first end, and projects outwardly from the peripheral surface of the winding core portion in the radial direction centered on the center axis. The coil component further includes a wire having a part that extends helically along the peripheral surface of the winding core portion with the center axis being an axis of a helix; and a top plate that extends through a longer range in a direction along the center axis than the winding core portion and is connected to the first flange portion and the second flange portion via an adhesive. The adhesive does not contact the winding core portion. When an area in which the adhesive is present on a surface of the top plate is referred to as a first presence area and a combined area consisting of an area in which the adhesive is present on a surface of the first flange portion and an area in which the adhesive is present on a surface of the second flange portion is referred to as a second presence area, the first presence area is larger than the second presence area.

With this configuration, part of the adhesive that spreads along the surface of the top plate functions as a protective layer for the top plate. The adhesive spreads beyond the areas on the surface of the top plate that are necessary to fix the flange portions to the top plate. Thus, the adhesive is present across a wide area on the surface of the top plate and the overall mechanical strength of the top plate and the adhesive is improved. As a result, damage to the top plate can be suppressed even when a load acts on the top plate.

When a load acts on the top plate, the top plate easily withstands the load and damage to the top plate is suppressed.

DETAILED DESCRIPTION

Coil Component of Embodiment

Figure 1:
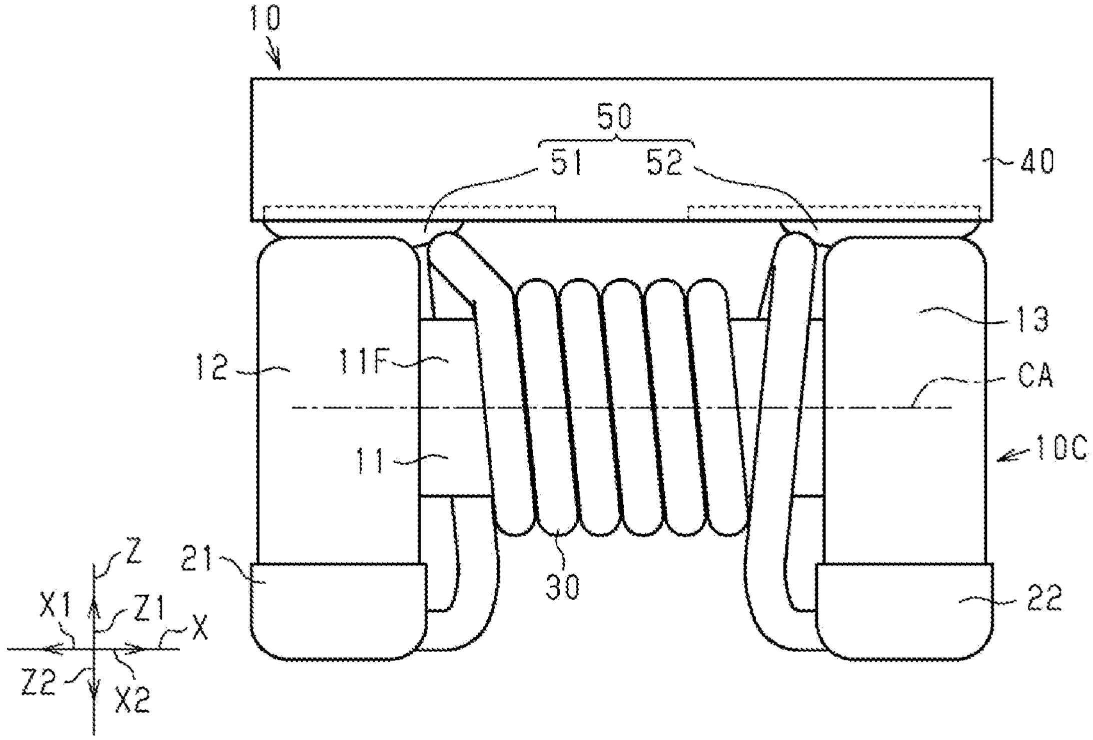
FIG. 1 is a side view of a coil component.

Hereafter, a coil component according to an embodiment will be described. In the drawings, constituent elements may be illustrated in an enlarged manner for ease of understanding. The dimensional ratios of the constituent elements may differ from the actual ratios or may differ from the ratios in other drawings. Furthermore, hatching is used in the sectional views, but the hatching of some constituent elements may be omitted for ease of understanding.

Overall Configuration

As illustrated in FIG. 1, a coil component 10 includes a core 10C. The core 10C includes a winding core portion 11. The winding core portion 11 has a quadrangular columnar shape. Therefore, the winding core portion 11 has a center axis CA and extends in a direction along the center axis CA. In addition, the winding core portion 11 has a peripheral surface 11F that surrounds the center axis CA.

Figure 2:
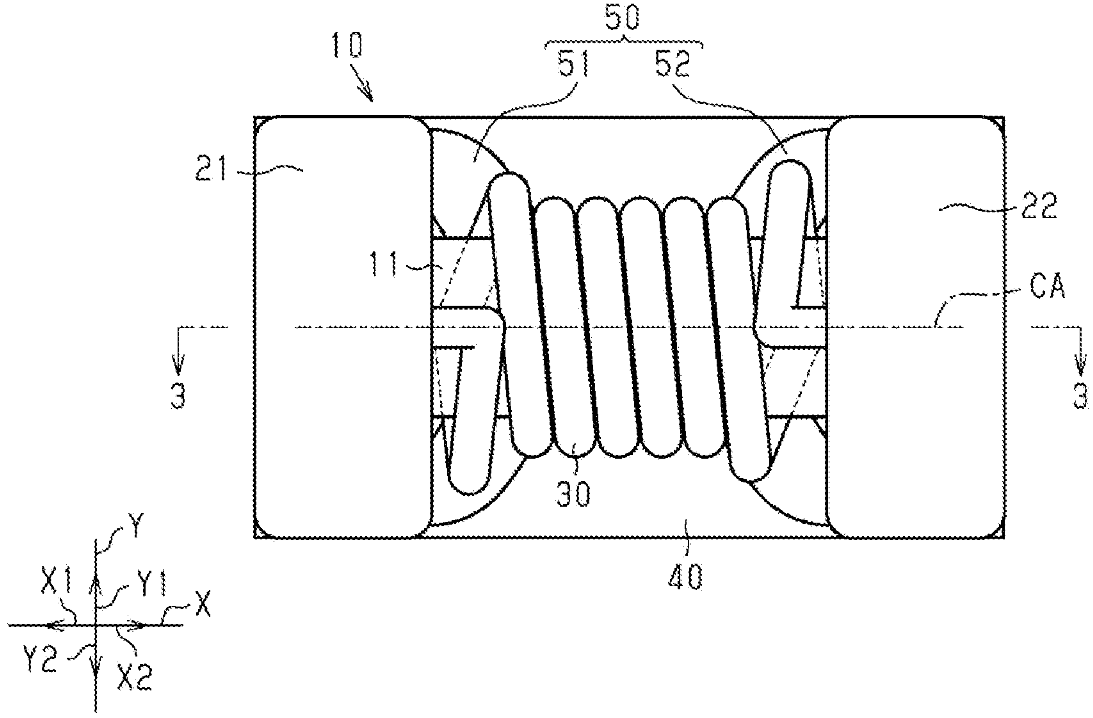
FIG. 2 is a bottom view of the coil component in FIG. 1.

In the following description, a first axis X is an axis that extends in a direction along the center axis CA. In addition, as illustrated in FIG. 2, a second axis Y is an axis that extends parallel to any particular side among four sides making up the quadrangular shape of a cross section of the winding core portion 11 perpendicular to the center axis CA. Then, as illustrated in FIG. 1, a third axis Z is an axis that is perpendicular to the first axis X and the second axis Y. In other words, the third axis Z is a perpendicular axis that is perpendicular to the center axis CA. In addition, one direction along the first axis X is referred to as a first positive direction X1 and the other direction along the first axis X is referred to as a first negative direction X2. In addition, as illustrated in FIG. 2, one direction along the second axis Y is referred to as a second positive direction Y1 and the other direction along the second axis Y is referred to as a second negative direction Y2. Furthermore, as illustrated in FIG. 1, one direction along the third axis Z is referred to as a third positive direction Z1 and the other direction along the third axis Z is referred to as a third negative direction Z2. In other words, a direction opposite to the third positive direction Z1 is the third negative direction Z2.

As illustrated in FIG. 1, the core 10C further includes a first flange portion 12 and a second flange portion 13. The first flange portion 12 is connected to a first end of the winding core portion 11, the first end being the end on the first positive direction X1 side. The first flange portion 12 projects outwardly from the peripheral surface 11F of the winding core portion 11 in a radial direction centered on the center axis CA. As illustrated in FIG. 2, the first and second flange portions 12 and 13 project from the peripheral surface 11F in the second positive direction Y1 and the second negative direction Y2 by the same amount. However, as illustrated in FIG. 1, the first and second flange portions 12 and 13 project from the peripheral surface 11F of the winding core portion 11 by a greater amount in the third negative direction Z2 than in the third positive direction Z1. In other words, the center of the first flange portion 12 in a direction along the third axis Z is shifted towards the third negative direction Z2 from the center axis CA of the winding core portion 11.

The second flange portion 13 is connected to a second end of the winding core portion 11, the second end being the end of the winding core portion 11 on the first negative direction X2 side. The second flange portion 13 is shaped so as to be symmetrical with the first flange portion 12 in a direction along the first axis X with the winding core portion 11 interposed therebetween. Cross sections of the first flange portion 12 and the second flange portion 13 perpendicular to the center axis CA of the winding core portion 11 have quadrangular shapes.

The material constituting the core 10C is a non-conductive material. The material of the core 10C is, for example, alumina, a nickel-zinc ferrite, a resin, or a mixture of these materials. The coil component 10 has a first terminal electrode 21 and a second terminal electrode 22.

Figure 3:
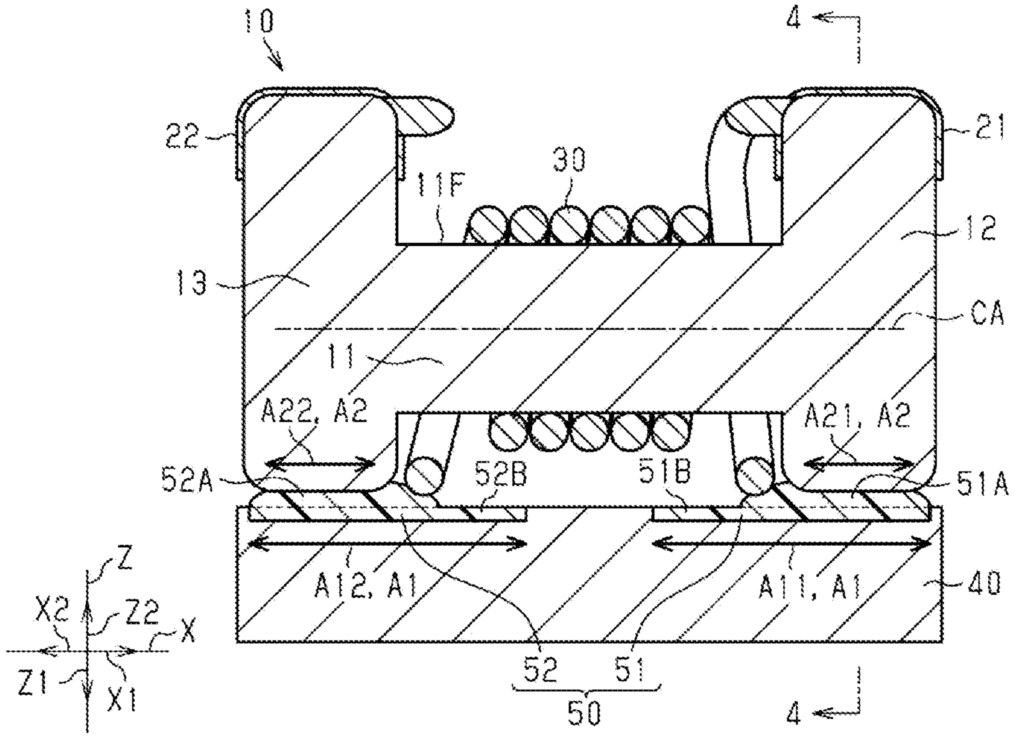
FIG. 3 is a sectional view taken along line 3-3 in FIG. 2.

As illustrated in FIG. 3, the first terminal electrode 21 is located on a surface of the first flange portion 12. Specifically, the first terminal electrode 21 is located on a surface of the first flange portion 12 at an end in the third negative direction Z2. The second terminal electrode 22 is located on a surface of the second flange portion 13. Specifically, the second terminal electrode 22 is located on a surface of the second flange portion 13 at an end in the third negative direction Z2.

The first terminal electrode 21 and the second terminal electrode 22 each consist of a metal layer composed of silver and a plating layer composed of copper, nickel, or tin applied to the surface of the metal layer. In this embodiment, the surface of the coil component 10 on which the first terminal electrode 21 and the second terminal electrode 22 are located, that is, the surface facing in the third negative direction Z2, is the surface that will face a substrate when the coil component 10 is mounted on a substrate.

As illustrated in FIG. 1, the coil component 10 includes a wire 30. A first end of the wire 30 is connected to the first terminal electrode 21. A second end of the wire 30 is connected to the second terminal electrode 22. Part of the wire 30 extends in a spiral shape along the peripheral surface 11F of the winding core portion 11 with the center axis CA acting as the axis of the helix. Specifically, a central part of the wire 30 between the first end and the second end of the wire 30 extends along the peripheral surface 11F in a spiral shape. On the other hand, part of the wire 30 extending from the first end of the wire 30 extends helically with the center axis CA as the axis of the helix so as to be separated from the peripheral surface 11F. Similarly, part of the wire 30 extending from the second end of the wire 30 extends helically with the center axis CA as the axis of the helix so as to be separated from the peripheral surface 11F.

The coil component 10 has a top plate 40. The top plate 40 has a rectangular plate-like shape that is longer in a direction along the first axis X than in a direction along the second axis Y. The top plate 40 is connected to an end of the core 10C that is on the third positive direction Z1 side. In other words, the top plate 40 is connected to the end of the core 10C that is on the opposite side from the end where the first terminal electrode 21 and the second terminal electrode 22 are disposed. The top plate 40 is connected to the core 10C so as to span between the end surface of the first flange portion 12 on the third positive direction Z1 side and the end surface of the second flange portion 13 on the third positive direction Z1 side. Therefore, the dimension of the top plate 40 in a direction along the first axis X is larger than the dimension of the winding core portion 11 in a direction along the first axis X. In other words, the top plate 40 extends through a longer range in a direction along the center axis CA than the winding core portion 11. Furthermore, as illustrated in FIG. 2, the dimension of the top plate 40 in a direction along the second axis Y is substantially the same as the dimension of the first flange portion 12 in a direction along the second axis Y and the dimension of the second flange portion 13 in a direction along the second axis Y.

Next, the surface roughness of the core 10C and the surface roughness of the top plate 40 will be described. The following values were measured on the surface of the top plate 40 facing in the third negative direction Z2 and the surface of the first flange portion 12 facing in the third positive direction Z1.

For the surface roughness of core 10C, a developed interfacial area ratio Sdr (ISO 25178) of the surface of core 10C is 0.08. An arithmetic mean value Spc of peak points TP of the surface of the core 10C is 2160. An arithmetic mean height Sa of the core 10C is 0.40. These values were measured using a non-contact method according to standard ISO 25178.

On the other hand, for the surface roughness of the top plate 40, a developed interfacial area ratio Sdr of the surface of the top plate 40 is 0.19. An arithmetic mean value Spc of peak points TP of the surface of the top plate 40 is 2860. An arithmetic mean height Sa of the surface of the top plate 40 is 0.28. Therefore, a developed interfacial area ratio Sdr of the surface of the top plate 40 is greater than or equal to 0.15 and less than or equal to 0.50 (i.e., from 0.15 to 0.50). Furthermore, the developed interfacial area ratio Sdr of the surface of the top plate 40 is larger than the developed interfacial area ratio Sdr of the surface of the core 10C.

Thus, the surfaces of the core 10C and the top plate 40 both have a certain roughness. The surface of the top plate 40 is rougher than the surface of the core 10C. As illustrated in FIG. 1, the top plate 40 is connected to the first flange portion 12 and the second flange portion 13 via an adhesive 50. However, the adhesive 50 does not contact the winding core portion 11. The adhesive 50 is divided into a first adhesive portion 51 that connects the top plate 40 and the first flange portion 12 to each other and a second adhesive portion 52 that connects the top plate 40 and the second flange portion 13 to each other. The adhesive 50 is a thermosetting adhesive, and is composed of, for example, an epoxy resin.

Figure 4:
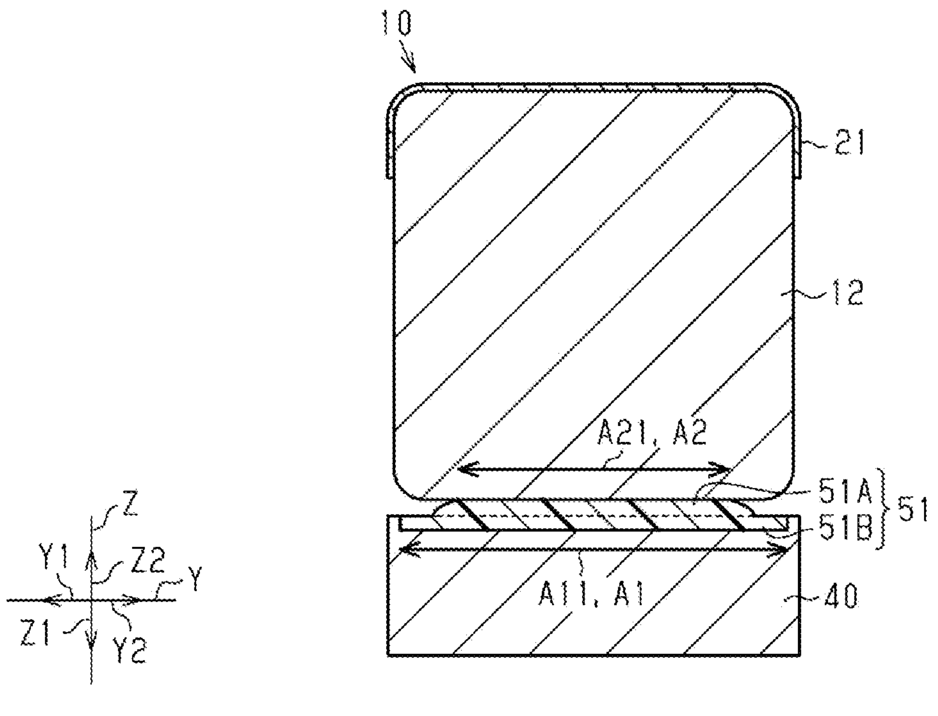
FIG. 4 is a sectional view taken along line 4-4 in FIG. 3.
Figure 5:
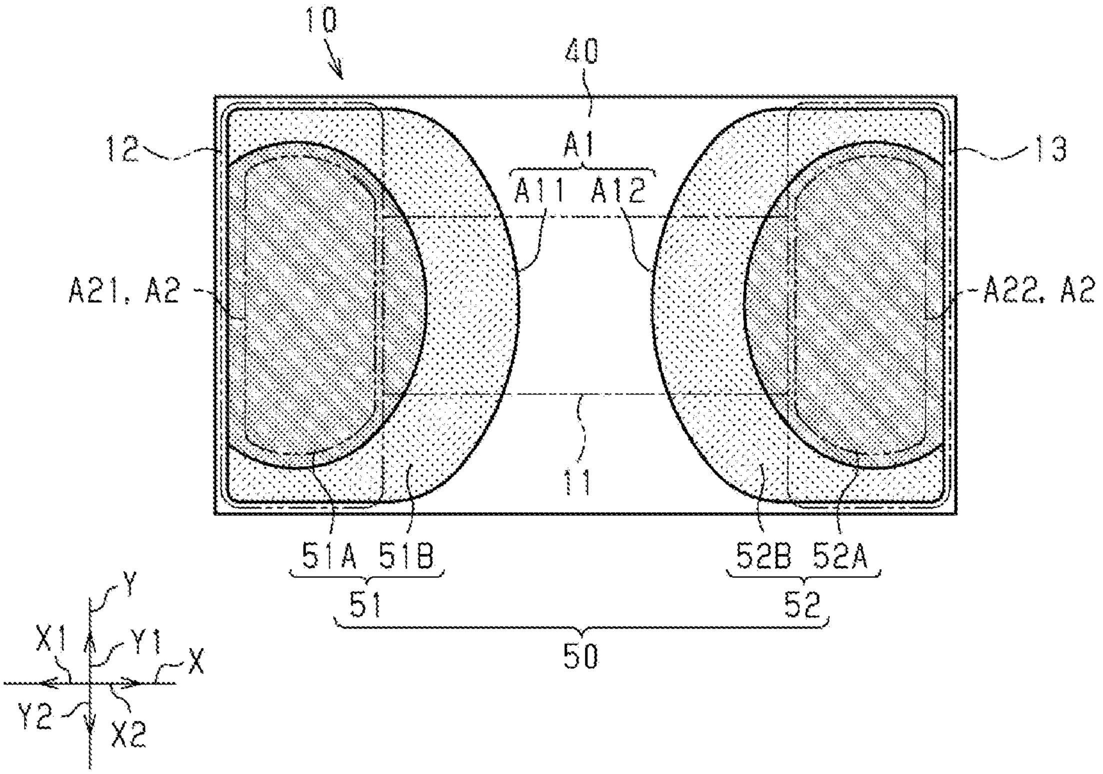
FIG. 5 is a bottom view of a top plate.

As illustrated in FIG. 4, the first adhesive portion 51 connects the first flange portion 12 and the top plate 40 to each other. In addition, as illustrated in FIG. 5, on a surface of the top plate 40 that faces in the third negative direction Z2, the first adhesive portion 51 is located toward the first positive direction X1 side with respect to the center of the surface in a direction along the first axis X.

Then, as illustrated in FIGS. 3 and 4, the first adhesive portion 51 spreads across a first area A11 out of the surface of the top plate 40 facing in the third negative direction Z2. As illustrated in FIG. 5, in the first area A11, the first adhesive portion 51 includes a first thick film portion 51A and a first thin film portion 51B.

Figure 6:
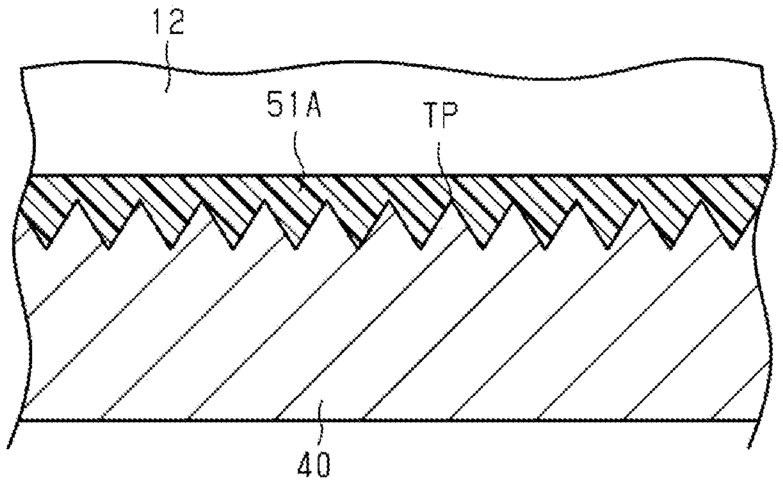
FIG. 6 is an explanatory diagram for describing a first thick film portion.

As illustrated in FIG. 6, the first thick film portion 51A is the part having a thickness that reaches to a position farther from the surface of the top plate 40 having roughness than the peak points TP on the surface. On the surface of the top plate 40 that faces in the third negative direction Z2, the first thick film portion 51A is located towards the first positive direction X1 side relative to the center of the top plate 40 in a direction along the first axis X.

Figure 7:
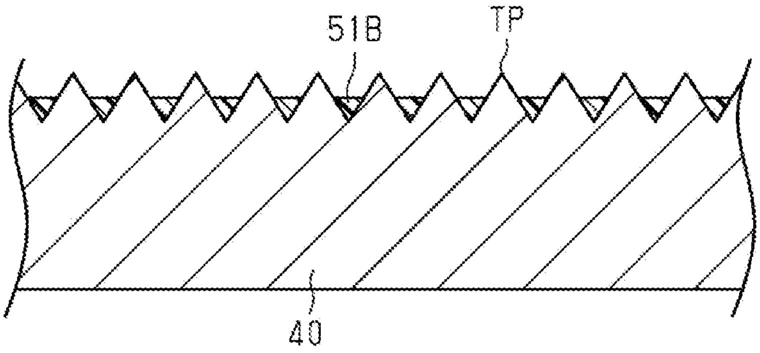
FIG. 7 is an explanatory diagram for describing a first thin film portion.

On the other hand, the first thin film portion 51B is the part having a thickness which is less than a thickness that reaches the peak points TP on the surface of the top plate 40 having roughness. In other words, as illustrated in FIG. 7, the first thin film portion 51B spreads into valley parts between the peak points TP on the surface of the top plate 40 having roughness, but the peak points TP of the top plate 40 are not covered. In addition, as illustrated in FIG. 5, the first thin film portion 51B surrounds the periphery of the first thick film portion 51A when looking in a direction along the third axis Z. The edge of the first thin film portion 51B on the first negative direction X2 side does not reach the center of the top plate 40 in a direction along the first axis X.

As illustrated in FIG. 4, the surface of the first flange portion 12 that faces in the third positive direction Z1 faces part of the first thin film portion 51B of the first adhesive portion 51. As illustrated in FIGS. 3 and 4, the first flange portion 12 is connected to the top plate 40 via part of the first thick film portion 51A of the first adhesive portion 51. Therefore, as illustrated in FIG. 5, a second area A21, which is the area where the adhesive 50 is present on the surface of the first flange portion 12, is smaller than the area where the first thick film portion 51A is present in the first adhesive portion 51. Therefore, the first area A11 is larger than the second area A21.

In addition, as illustrated in FIG. 3, the second adhesive portion 52 spreads across a third area A12 out of the surface of the top plate 40 facing in the third negative direction Z2. As illustrated in FIG. 5, in the third area A12, the second adhesive portion 52 includes a second thick film portion 52A and a second thin film portion 52B.

When looking in a direction along the third axis Z, the second adhesive portion 52 has line symmetry with the first adhesive portion 51 with an axis parallel to the second axis Y extending through the center of the top plate 40 in a direction along the first axis X serving as the axis of symmetry. Therefore, similarly to the first thick film portion 51A, the second thick film portion 52A is the part having a thickness that extends to a position farther from the surface of the top plate 40 having roughness than the peak points TP on the surface. On the surface of the top plate 40 that faces in the third negative direction Z2, the second thick film portion 52A is located at an end towards the first negative direction X2 side relative to the center of the top plate 40 in a direction along the first axis X.

In addition, similarly to the first thin film portion 51B, the second thin film portion 52B is the part not having a thickness that reaches the peak points TP on the surface of the top plate 40 having roughness. In other words, the second thin film portion 52B spreads into valley parts between the peak points TP on the surface of the top plate 40 having roughness, but the peak points TP of the top plate 40 are not covered. In addition, the second thin film portion 52B surrounds the periphery of the second thick film portion 52A when looking in a direction along the third axis Z. The edge of the second thin film portion 52B in the first positive direction X1 does not reach the center of the top plate 40 in a direction along the first axis X. Therefore, the second thin film portion 52B and the first thin film portion 51B do not contact each other. In other words, the first area A11 is separated from the third area A12. When the area of the surface of the top plate 40 where the adhesive 50 is present is referred to as a first presence area A1, the first presence area A1 is the area consisting of the first area A11 and the third area A12.

As illustrated in FIG. 4, the surface of the second flange portion 13 that faces in the third positive direction Z1 faces part of the second thin film portion 52B of the second adhesive portion 52. In addition, as illustrated in FIG. 3, the second flange portion 13 is connected to the top plate 40 via part of the second thick film portion 52A of the second adhesive portion 52. Therefore, as illustrated in FIG. 5, a fourth area A22, which is an area where the adhesive 50 is present on the surface of the second flange portion 13, is smaller than the area where the second thick film portion 52A is present in the second adhesive portion 52. Therefore, the third area A12 is larger than the fourth area A22.

An area consisting of the second area A21 and the fourth area A22 is referred to as a second presence area A2. The first presence area A1 is larger than the second presence area A2. Specifically, the first presence area A1 is at least 1.1 times the size of the second presence area A2.

In addition, when looking in a direction along the third axis Z, the surface of the winding core portion 11 facing the top plate 40 overlaps part of the first area A11 and part of the third area A12. In other words, parts of the first presence area A1 face the winding core portion 11. The first thin film portion 51B and the second thin film portion 52B are included in the parts of the first presence area A1 that face the winding core portion 11.

Manufacturing Method

Figure 8:
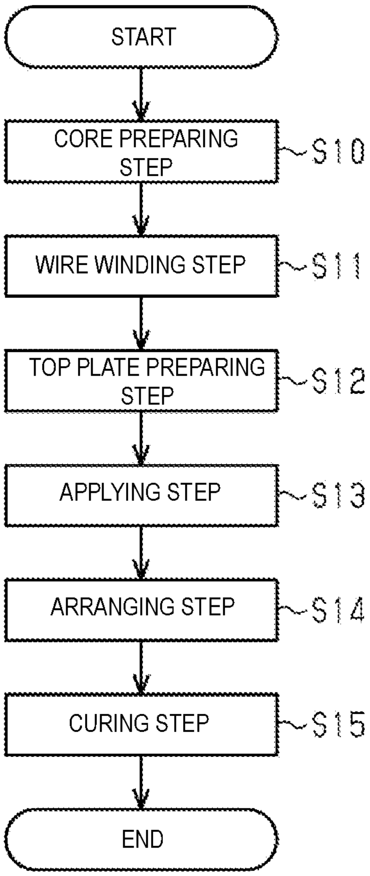
FIG. 8 is an explanatory diagram for describing a method for manufacturing a coil component.

Next, a method of manufacturing the coil component 10 will be described. As illustrated in FIG. 8, a method of manufacturing the coil component 10 includes a core preparing step S10, a wire winding step S11, a top plate preparing step S12, an applying step S13, an arranging step S14, and a curing step S15.

In the core preparing step S10, first, the core 10C is prepared. For example, a molded body obtained by press molding a ferrite powder in a mold is fired. After the firing, a deburring process is performed to remove burrs. Thus, the core 10C including the winding core portion 11, the first flange portion 12, and the second flange portion 13 is formed.

Next, the first terminal electrode 21 is formed on a surface of the first flange portion 12 of the core 10C and the second terminal electrode 22 is formed on a surface of the second flange portion 13 of the core 10C. For example, the terminal electrodes are formed by performing plating.

Next, the wire winding step S11 is performed. In the wire winding step S11, the wire 30 is wound around the winding core portion 11. In the wire 30, in directions along the first axis X, about one turn at each end is wound so as to be separated from the peripheral surface 11F of the winding core portion 11. After that, a first end of the wire 30 is pressure bonded to the first terminal electrode 21. A second end of the wire 30 is pressure bonded to the second terminal electrode 22. Thus, the core 10C having the wire 30 wound therearound is prepared.

Next, the top plate preparing step S12 is performed. In the top plate preparing step S12, the top plate 40 having a certain surface roughness is prepared. Specifically, as described above, a top plate 40 having a developed interfacial area ratio Sdr greater than or equal to 0.15 and less than or equal to 0.50 (i.e., from 0.15 to 0.50) is prepared. In the top plate preparing step S12, similarly to as in the core preparing step S10, the top plate 40 is formed by firing a molded body obtained by press molding a ferrite powder in a mold and then performing a deburring process on the fired molded body.

Next, the applying step S13 is performed. In the applying step S13, first, the adhesive 50 is applied to two places on the two end portions, in a direction along the first axis X, of the surface of the top plate 40 that faces the core 10C. Specifically, prescribed amounts of the adhesive 50 are dispensed from a dispenser. At this time, the adhesive 50 placed on the top plate 40 has a reasonable thickness due to its surface tension. Next, a prescribed amount of time is allowed to pass. The prescribed amount of time is, for example, from several seconds to several tens of seconds and is an amount of time during which the fluidity of the adhesive 50 is not lost. Therefore, the adhesive 50 gradually spreads to the periphery of the surface of the top plate 40 having roughness when looking in a direction along the third axis Z. Therefore, the thickness of the adhesive 50 gradually decreases and the area over which the adhesive 50 is applied increases when looking in a direction along the third axis Z. More specifically, a center part of the spread adhesive 50 has a thickness extending to a position farther from the surface of the top plate 40 having roughness than the peak points TP. On the other hand, an edge part of the spread adhesive 50 does not have a thickness that reaches the peak points TP on the surface of the top plate 40 having roughness. One of the two locations where the adhesive 50 is applied forms the first adhesive portion 51 and the other forms the second adhesive portion 52.

Next, the arranging step S14 is performed. In the arranging step S14, the first flange portion 12 and the second flange portion 13 of the core 10C are disposed so that the surfaces thereof face the surface of the top plate 40 to which the adhesive 50 has been applied. Thus, out of the adhesive 50 applied to the two locations on the top plate 40, parts of the parts having a thickness that extends to a position farther from the surface of the top plate 40 having roughness than the peak points TP on the surface contact the first flange portion 12 and the second flange portion 13. In other words, the area where the adhesive 50 has been applied to the surface of the top plate 40 in the applying step S13 is larger than the combined area consisting of the area where the adhesive 50 contacts the first flange portion 12 and the area where the adhesive 50 contacts the second flange portion 13 in the arranging step S14.

Furthermore, the area where the adhesive 50 has been applied to the top plate 40 also contacts parts of the wire 30 that extend away from the peripheral surface 11F. However, the first flange portion 12 and the second flange portion 13 are brought into contact with the adhesive 50 without the adhesive 50 contacting the winding core portion 11. More specifically, the thickness of the spread adhesive 50 is smaller than the amount by which the first flange portion 12 and the second flange portion 13 project from the peripheral surface 11F of the winding core portion 11 in the third positive direction Z1. Furthermore, edge parts of the spread adhesive 50, which do not have a thickness that reaches the peak points TP on the surface of the top plate 40 having roughness, do not contact the core 10C.

Next, the curing step S15 is performed. In the curing step S15, the core 10C and the top plate 40, which are disposed with the adhesive 50 therebetween, are subjected to a heat treatment. Thus, the adhesive 50 is cured. As a result, the top plate 40 is connected to the core 10C via the adhesive 50. Specifically, the first adhesive portion 51, which is located on the first positive direction X1 side relative to the center of the top plate 40 in a direction along the first axis X, and the second adhesive portion 52, which is disposed on the first negative direction X2 side relative to the center of the top plate 40 in a direction along the first axis X, are cured. In the first adhesive portion 51, the first area A11 where the adhesive 50 is present on the surface of the top plate 40 is larger than the second area A21 where the adhesive 50 is present on the surface of the first flange portion 12. In the second adhesive portion 52, the third area A12 where the adhesive 50 is present on the surface of the top plate 40 is larger than the fourth area A22 where the adhesive 50 is present on the surface of the second flange portion 13. In other words, the first presence area A1 is larger than the second presence area A2. Thus, the coil component 10 is complete.

Actions of Embodiment

When mounting the coil component 10 on a substrate, the surface of the top plate 40 that faces in the third positive direction Z1 is held by a holding tool and mounted on the substrate. At this time, a load is applied to the top plate 40 in the third negative direction Z2. When such a load is applied, if the top plate 40 is thin, for example, the top plate 40 by itself may be unable to withstand the load and may be damaged.

According to the above-described embodiment, the first presence area A1, which is a combined area consisting of the first area A11 and the third area A12, is larger than the second presence area A2, which consists of the second area A21 and the fourth area A22. Therefore, the parts of the first presence area A1 of the adhesive 50 that face the second presence area A2 act so as to fix the first flange portion 12 and the second flange portion 13 to the top plate 40. On the other hand, in the regions of the first presence area A1 not facing the second presence area A2, the adhesive 50 spreads over a wider area than the second presence area A2 along the surface of the top plate 40, and there is an area in which the adhesive 50 is not present in addition to the thickness of the top plate 40.

Effects of Embodiment

1. According to the above-described embodiment, the parts of the adhesive 50 that spread along the surface of the top plate 40 function as a protective layer for the top plate 40. On the surface of the top plate 40, the first presence area A1 in which the adhesive 50 is present is larger than the second presence area A2 consisting of the area in which the adhesive 50 exists on the surface of the first flange portion 12 and the area in which the adhesive 50 exists on the surface of the second flange portion 13. Therefore, the adhesive 50 spreads beyond the areas on the surface of the top plate 40 that would be necessary for fixing the first flange portion 12 and the second flange portion 13 to the top plate 40. Thus, the adhesive 50 is present across a wide area on the surface of the top plate 40 and loads acting on the top plate 40 in directions along the third axis Z are more easily withstood in accordance with the amount of the adhesive 50 present. As a result, the occurrence of damage can be suppressed even when a load acts on the top plate 40.

The adhesive 50 does not contact the winding core portion 11. If the adhesive 50 were to reach the winding core portion 11, there would be a risk of a large part of the wire 30 contacting the adhesive 50 and the coating film of the wire 30 becoming deteriorated. Therefore, the occurrence of short circuits between adjacent parts of the wire caused by such deterioration can be avoided. In addition, an excessively large amount of adhesive 50 is not required compared to the minimum amount of adhesive needed to adhere the first flange portion 12 and the second flange portion 13 to the top plate 40.

2. According to the above-described embodiment, when looking in a direction along the third axis Z, the surface of the winding core portion 11 facing the top plate 40 overlaps part of the first area A11 and part of the third area A12. In other words, parts of the first presence area A1 face the winding core portion 11. The winding core portion 11 is located in the center of the coil component 10 in a direction along the second axis Y. Therefore, since the top plate 40 is reinforced by the adhesive 50, even when a load acts on the top plate 40 when the coil component 10 is being mounted on a substrate, the top plate 40 is able to withstand the load.

3. According to the above-described embodiment, the size of the first presence area A1 is greater than or equal to 1.1 times the size of the second presence area A2. Provided that the area of the first presence area A1 is at least 1.1 times that of the second presence area A2, there will be an area of sufficient size to reinforce the top plate 40.

4. According to the above-described embodiment, the developed interfacial area ratio Sdr of the surface of the top plate 40 is greater than or equal to 0.15 and less than or equal to 0.50 (i.e., from 0.15 to 0.50). Therefore, when the adhesive 50 is applied to the surface of the top plate 40, the adhesive 50 readily spreads between fine protrusions and recesses on the top plate 40. Therefore, the adhesive 50 can be applied across a wide area on the surface of the top plate 40 without adopting a special method for applying the adhesive 50.

5. According to the above-described embodiment, the developed interfacial area ratio Sdr of the surface of the top plate 40 is larger than the developed interfacial area ratio Sdr of the surfaces of the first flange portion 12 and the second flange portion 13. Therefore, the adhesive 50 spreads more easily along the surface of the top plate 40 than along the surfaces of the first flange portion 12 and the second flange portion 13. As a result, the area across which the adhesive 50 spreads along the surface of the top plate 40 is easily made larger than the area across which the adhesive 50 spreads along the surfaces of the first flange portion 12 and the second flange portion 13.

OTHER EMBODIMENTS

The above-described embodiment can be modified in the following ways. The embodiment and the following modifications can be combined with each other to the extent that there are no technical contradictions.

The shape of the winding core portion 11 in the above-described embodiment is not limited to the example given in the above-described embodiment. For example, the shape may be a cylindrical shape or may be a polygonal columnar shape other than a quadrangular columnar shape.

In the above-described embodiment, a plurality of wires 30 may be wound around the winding core portion 11. The number of terminal electrodes may be appropriately adjusted in accordance with the number of wires 30.

In the above-described embodiment, part of the wire 30 does not have to contact the adhesive 50.

In the above-described embodiment, the shape of the top plate 40 is not limited to the example given in the embodiment. It is sufficient that the top plate 40 span between the first flange portion 12 and the second flange portion 13, and for example, a protrusion may be provided on the surface of the top plate 40 that faces in the third negative direction Z2.

In the above-described embodiment, the first presence area A1 does not need to be provided in a part facing the winding core portion 11. For example, the first area A11 may be present only in a part facing the first flange portion 12 and the second area A21 may be present only on part of the surface of the first flange portion 12 facing in the third positive direction Z1.

In the above-described embodiment, the first area A11 and the third area A12 are separated from each other, but may instead contact each other to form a single first presence area A1. In addition, the first presence area A1 may consist of three or more separate areas.

In the above-described embodiment, the adhesive 50 may be entirely formed of thick film portions. For example, an appropriate amount of adhesive 50 may be applied to the entirety of the surface of the top plate 40 facing in the third negative direction Z2 so that the adhesive 50 is entirely formed of thick film portions. In this case as well, the adhesive 50 preferably does not contact the winding core portion 11.

In the above-described embodiment, the developed interfacial area ratio Sdr of the top plate 40 and the developed interfacial area ratio Sdr of the core 10C are not limited to the examples given in the embodiment. The developed interfacial area ratio Sdr of the top plate 40 may be less than 0.15 or greater than 0.50 (i.e., from 0.15 to 0.50). In addition, the developed interfacial area ratio Sdr of the top plate 40 may be less than or equal to the developed interfacial area ratio Sdr of the core 10C. In this case, the adhesive 50 may be applied to the top plate 40 in advance in order to spread the adhesive 50 across a wide area on the surface of the top plate 40 facing in the third negative direction Z2. In addition, after placing the adhesive 50 on the top plate 40, the adhesive 50 may be spread using a tool or by using a spin coating process.

In the above-described embodiment, the size of the first presence area A1 may be less than 1.1 times the size of the second presence area A2. In the applying step S13, so long as variations are unlikely to occur in the area over which the adhesive 50 is applied, the size of the first presence area A1 is highly likely to be larger than the size of the second presence area A2 even if the size of the first presence area A1 is less than 1.1 times the size of the second presence area A2.

In the above-described embodiment, the adhesive 50 is a thermosetting adhesive 50, but the type of adhesive 50 may be changed as appropriate. The adhesive 50 may consist of just resin or may be formed by adding an inorganic filler such as silica filler to resin. In the case where the adhesive 50 contains inorganic filler, the inorganic filler will tend to be present only in the thick film portions.

In the applying step S13 of the manufacturing method of the above-described embodiment, the adhesive 50 is not applied to the first flange portion 12 and the second flange portion 13, but the adhesive 50 may also be applied to the surfaces of the first flange portion 12 and the second flange portion 13.

Furthermore, in the applying step S13, in addition to waiting for a prescribed amount of time to pass to allow the adhesive 50 to spread across the surface of the top plate 40, a material having greater wettability may be used as the material of the top plate 40 or an adhesive 50 having higher viscosity may be used.

What is claimed is:

1. A coil component comprising:

a core including a winding core portion having a center axis, a first flange portion connected to a first end, in a direction along the center axis, of the winding core portion and projecting outwardly from a peripheral surface of the winding core portion in a radial direction centered on the center axis, and a second flange portion connected to a second end of the winding core portion, the second end being on an opposite side from the first end, and projecting outwardly from the peripheral surface of the winding core portion in the radial direction centered on the center axis;

a wire having a portion that extends helically along the peripheral surface of the winding core portion with respect to the center axis as an axis of a helix; and a top plate that is longer than the winding core portion in a direction along the center axis and that is attached to the first flange portion and the second flange portion via an adhesive, wherein the adhesive is out of contact with the winding core portion, when a first area is an area in which the adhesive is present on a surface of the top plate, and a second area is a combined area including an area in which the adhesive is present on a surface of the first flange portion and an area in which the adhesive is present on a surface of the second flange portion, the first area is larger than the second area, and top plate has recesses that receive the adhesive and which define the first area.

2. The coil component according to claim 1, wherein a portion of the first area faces the winding core portion.

3. The coil component according to claim 2, wherein in the first area, the adhesive includes a thick film portion and a thin film portion, the thick film portion is a portion having a thickness that exceeds the thickness from the surface of the top plate to peak points on the surface of the top plate, the thin film portion is a portion having a thickness that is less than the thickness from the surface of the top plate to the peak points on the surface of the top plate, and the thin film portion faces the winding core portion.

4. The coil component according to claim 1, wherein a size of the first area is greater than or equal to 1.1 times a size of the second area.

5. The coil component according to claim 1, wherein a developed interfacial area ratio of the surface of the top plate is from 0.15 to 0.50.

6. The coil component according to claim 1, wherein a developed interfacial area ratio of the surface of the top plate is larger than a developed interfacial area ratio of the surfaces of the first flange portion and the second flange portion.

7. The coil component according to claim 2, wherein a size of the first area is greater than or equal to 1.1 times a size of the second area.

8. The coil component according to claim 3, wherein a size of the first area is greater than or equal to 1.1 times a size of the second area.

9. The coil component according to claim 2, wherein a developed interfacial area ratio of the surface of the top plate is from 0.15 to 0.50.

10. The coil component according to claim 3, wherein a developed interfacial area ratio of the surface of the top plate is from 0.15 to 0.50.

11. The coil component according to claim 4, wherein a developed interfacial area ratio of the surface of the top plate is from 0.15 to 0.50.

12. The coil component according to claim 7, wherein a developed interfacial area ratio of the surface of the top plate is from 0.15 to 0.50.

13. The coil component according to claim 8, wherein a developed interfacial area ratio of the surface of the top plate is from 0.15 to 0.50.

14. The coil component according to claim 2, wherein a developed interfacial area ratio of the surface of the top plate is larger than a developed interfacial area ratio of the surfaces of the first flange portion and the second flange portion.

15. The coil component according to claim 3, wherein a developed interfacial area ratio of the surface of the top plate is larger than a developed interfacial area ratio of the surfaces of the first flange portion and the second flange portion.

16. The coil component according to claim 4, wherein a developed interfacial area ratio of the surface of the top plate is larger than a developed interfacial area ratio of the surfaces of the first flange portion and the second flange portion.

17. The coil component according to claim 5, wherein a developed interfacial area ratio of the surface of the top plate is larger than a developed interfacial area ratio of the surfaces of the first flange portion and the second flange portion.

18. The coil component according to claim 7, wherein a developed interfacial area ratio of the surface of the top plate is larger than a developed interfacial area ratio of the surfaces of the first flange portion and the second flange portion.

19. The coil component according to claim 8, wherein a developed interfacial area ratio of the surface of the top plate is larger than a developed interfacial area ratio of the surfaces of the first flange portion and the second flange portion.

20. The coil component according to claim 9, wherein a developed interfacial area ratio of the surface of the top plate is larger than a developed interfacial area ratio of the surfaces of the first flange portion and the second flange portion.

* * * * *